United States Patent
Matsusaki et al.

(10) Patent No.: US 7,424,830 B2
(45) Date of Patent: Sep. 16, 2008

(54) TORQUE SENSOR

(75) Inventors: Toshimichi Matsusaki, Takahagi (JP); Tatsuya Ohtaka, Hitachi (JP); Kouichi Sato, Hitachi (JP); Yukio Ikeda, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 141 days.

(21) Appl. No.: 11/390,122

(22) Filed: Mar. 28, 2006

(65) Prior Publication Data

US 2007/0012122 A1 Jan. 18, 2007

(30) Foreign Application Priority Data

Jul. 15, 2005 (JP) .............................. 2005-207832

(51) Int. Cl.
*G01L 3/10* (2006.01)
(52) U.S. Cl. .............................. 73/862.331; 73/862.332
(58) Field of Classification Search ............ 73/862.331, 73/862.333, 862.329, 862.325, 862.326, 73/862.332
See application file for complete search history.

(56) References Cited

U.S. PATENT DOCUMENTS

| | | | |
|---|---|---|---|
| 2003/0209087 A1 | 11/2003 | Nakane et al. | |
| 2003/0233889 A1 | 12/2003 | Nakane et al. | |
| 2004/0011138 A1 | 1/2004 | Gandel et al. | |
| 2004/0112146 A1 | 6/2004 | Islam et al. | |

FOREIGN PATENT DOCUMENTS

| | | | |
|---|---|---|---|
| GB | 578859 A | | 7/1946 |
| GB | 578860 A | | 7/1946 |
| JP | 59032835 A | * | 2/1984 |
| JP | 01140036 A | * | 6/1989 |
| JP | 01244323 A | * | 9/1989 |
| JP | 2001-4314 A | | 1/2001 |
| JP | 2002071478 A | * | 3/2002 |
| JP | 2003-149062 A | | 5/2003 |
| JP | 2004-519672 A | | 7/2004 |
| JP | 2006052969 A | * | 2/2006 |
| WO | WO 2005022103 A1 | * | 3/2005 |

* cited by examiner

*Primary Examiner*—Edward Lefkowitz
*Assistant Examiner*—Punam Patel
(74) *Attorney, Agent, or Firm*—Foley & Lardner LLP

(57) ABSTRACT

A torque sensor 1 is provided with two shafts 3, 4 (input shaft 3 and output shaft 4) which constitute a shaft member 2, which is a torque detection object, an elastic member 5 which connects the shafts 3 and 4 coaxially, and a torsion angle of the elastic member 5 is detected as a torque which affects on the shaft member 2. The torque sensor 1 is provided with a hard magnetic member 6 which generates a magnetic flux therearound, a pair of first soft magnetic members 7, 8 which constitute a first magnetic circuit H1 together with the hard magnetic member 6 to change a reluctance by torsion of the elastic member 5, a pair of second soft magnetic members 9, 10 which constitute a second magnetic circuit H2 together with the hard magnetic member 6 to keep the reluctance constant, and a flux detection means 12 which detects a flux density of the second magnetic circuit H2 that varies in accordance with a torsion angle of the elastic member 5.

16 Claims, 8 Drawing Sheets

6 HARD MAGNETIC MEMBER
7 FIRST SOFT MAGNETIC MEMBER
9 SECOND SOFT MAGNETIC MEMBER
13A PROTRUSION
14A PROTRUSION
15 EXTENDED PIECE
16 EXTENDED PIECE
11 THIRD SOFT MAGNETIC MEMBER
8 FIRST SOFT MAGNETIC MEMBER
10 SECOND SOFT MAGNETIC MEMBER

7 FIRST SOFT MAGNETIC MEMBER
13A

TORQUE SENSOR

The present application is based on Japanese Patent Application No. 2005-207832 filed on Jul. 15, 2005, the entire contents of which are incorporated herein by reference.

BACKGROUND OF THE INVENTION

1. Field of the Invention

The present invention relates to a torque sensor, more particularly, to a torque sensor for detecting an engine torque in a mechanism for transmitting a revolution power of an electrically operated power steering apparatus.

2. Description of the Related Art

Conventionally, as a torque sensor of this kind, a torque sensor comprising an elastic member (torsion bar) for coaxially connecting two shafts (an input shaft and an output shaft) constituting a shaft member, a hard magnetic member (magnet) installed at one of two ends of the elastic member, a pair of tooth soft magnetic members (yokes) installed at another one of the two end portions, and a magnetometric sensor for detecting a magnetic flux density generated between the tooth soft magnetic members has been proposed, for example, by Japanese Patent Laid-Open No. 2003-149062 (JP-A-2003-149062) and published Japanese translation of PCT International publication No. 2004-519672 (JP-T-2004-519672).

In such torque sensor, a torque of the shaft member is detected as follows. When torsion is occurred in the elastic member, a magnetic pole position of the hard magnetic member and a tooth position of the soft magnetic member are changed relatively in a circumferential direction, so that a magnitude of the magnetic flux induced by the soft magnetic member is varied in accordance with the relative position of the magnetic pole position of the hard magnetic member and the tooth position of the soft magnetic member. The torque of the shaft member is detected by measuring the variation magnitude of the magnetic flux.

Now, in the torque sensor, a size of the magnet is limited by limitation in a total size of the sensor. In addition, the magnetic pole amplitude of the magnet becomes small, since a magnet having a large number of magnetic poles is used to improve torque detection accuracy for the torsion of the elastic member.

Therefore, in the conventional torque sensors disclosed by JP-A-2003-149062 and JP-T-2004-519672, a high strictness is required in dimensional accuracy between the magnet and the soft magnetic members. When variation exists in dimensions between the magnet and the soft magnetic members, a detection error is easily occurred, so that reliability in quality is decreased. Such a phenomenon is remarkable when a diameter of the magnet and the magnetic pole amplitude become small. As a result, there is a problem in that processing and assembling accuracy of the magnet and soft magnetic members becomes high, so that processing and assembling cost is increased as well as much time for processing and assembling is spent.

In addition, in the conventional torque sensors shown in JP-A-2003-149062 and JP-T-2004-519672, there is a problem in that the magnetic pole variation in a circumferential direction is generated, so that assembling of a magnetic yoke becomes difficult, as a result, an excellent assembling workability of the whole sensor cannot be obtained.

SUMMARY OF THE INVENTION

Accordingly, it is an object of the invention to provide a torque sensor, by which the processing and assembling cost can be reduced and an excellent assembling workability of the whole sensor can be obtained.

According to a first feature of the invention, a torque sensor, comprises:
a shaft member including two shafts;
an elastic member for connecting the shafts coaxially with each other, a torsion angle of the elastic member being detected as a torque that affects on the shaft member;
a hard magnetic member for generating a magnetic flux therearound;
a pair of first soft magnetic members that constitute a first magnetic circuit together with the hard magnetic member to change a reluctance by torsion of the elastic member;
a pair of second soft magnetic members which constitute a second magnetic circuit together with the hard magnetic member to keep the reluctance constant; and
a flux detection means for detecting a flux density of the second magnetic circuit that varies in accordance with the torsion angle of the elastic member.

According to a second feature of the invention, in the torque sensor, the hard magnetic member is fixed to one of the two shafts, in which an N pole and an S pole are magnetized in an axial direction, the first soft magnetic members are disposed in parallel with each other in the axial direction around the hard magnetic member and are fixed to the two shafts, respectively, and the flux detection means is disposed between the second soft magnetic members.

According to a third feature of the invention, the torque sensor, further comprises:
a third soft magnetic member disposed between one of the first soft magnetic members and the hard magnetic member.

According to a fourth feature of the invention, in the torque sensor, the hard magnetic member has a cylindrical shape.

According to a fifth feature of the invention, in the torque sensor, each of the first soft magnetic members has a cylindrical shape.

According to a sixth feature of the invention, each of the second soft magnetic members has a cylindrical shape.

According to a seventh feature of the invention, in the torque sensor, the third soft magnetic member has a cylindrical shape.

According to an eighth feature of the invention, in the torque sensor, each of the first soft magnetic members has protrusions disposed in parallel with each other in a circumferential direction such that tip end surfaces of the protrusions of the first soft magnetic members are faced to each other at a predetermined interval in the axial direction.

According to a ninth feature of the invention, in the torque sensor, each of the protrusions is provided with an inclined face formed by cutting off a circumferential direction part of a free end.

According to a tenth feature of the invention, in the torque sensor, each of the protrusions is provided with an inclined face formed by cutting off a diametrical direction part of a free end.

According to an eleventh feature of the invention, in the torque sensor, a tip end surface of each of the protrusions has a configuration which varies a variation magnitude of a facing area of the tip end surface in accordance with variation of the torsion angle of the elastic member.

According to a twelfth feature of the invention, in the torque sensor, the protrusions adjacent in the circumferential direction have different dimensions along the circumferential direction of one of the first soft magnetic members.

According to a thirteenth feature of the invention, in the torque sensor, each of the first soft magnetic members has protrusions disposed in parallel with each other in a circumferential direction such that inner surfaces of the protrusions of one of the first soft magnetic members are faced to outer surfaces of the protrusions of another one of the first soft magnetic members.

According to a fourteenth feature of the invention, in the torque sensor, each of the inner surfaces of the protrusions of the one of the first soft magnetic members and the outer surfaces of the protrusions of the another one of the first soft magnetic members is provided with a stepped portion.

According to a fifteenth feature of the invention, in the torque sensor, the flux detection means comprises a plurality of flux detectors having different temperature characteristics, and the flux detectors are disposed selectively in the second magnetic circuit.

According to the present invention, the processing and assembling cost can be reduced and the excellent assembling workability of the whole sensor can be obtained.

BRIEF DESCRIPTION OF THE DRAWINGS

Preferred embodiments present invention will be described in conjunction with appended drawings, wherein:

FIGS. 4A and 4B are perspective views showing an operation of the torque sensor in the preferred embodiment according to the present invention, wherein FIG. 4A is a perspective view showing the torque sensor before torsional deformation of an elastic member and FIG. 4B is a perspective view showing the torque sensor after the torsional deformation of the elastic member;

DESCRIPTION OF THE PREFERRED EMBODIMENT

Preferred embodiment according to the present invention will be explained in detail hereinafter by referring to the appended drawings.

Figure 1:
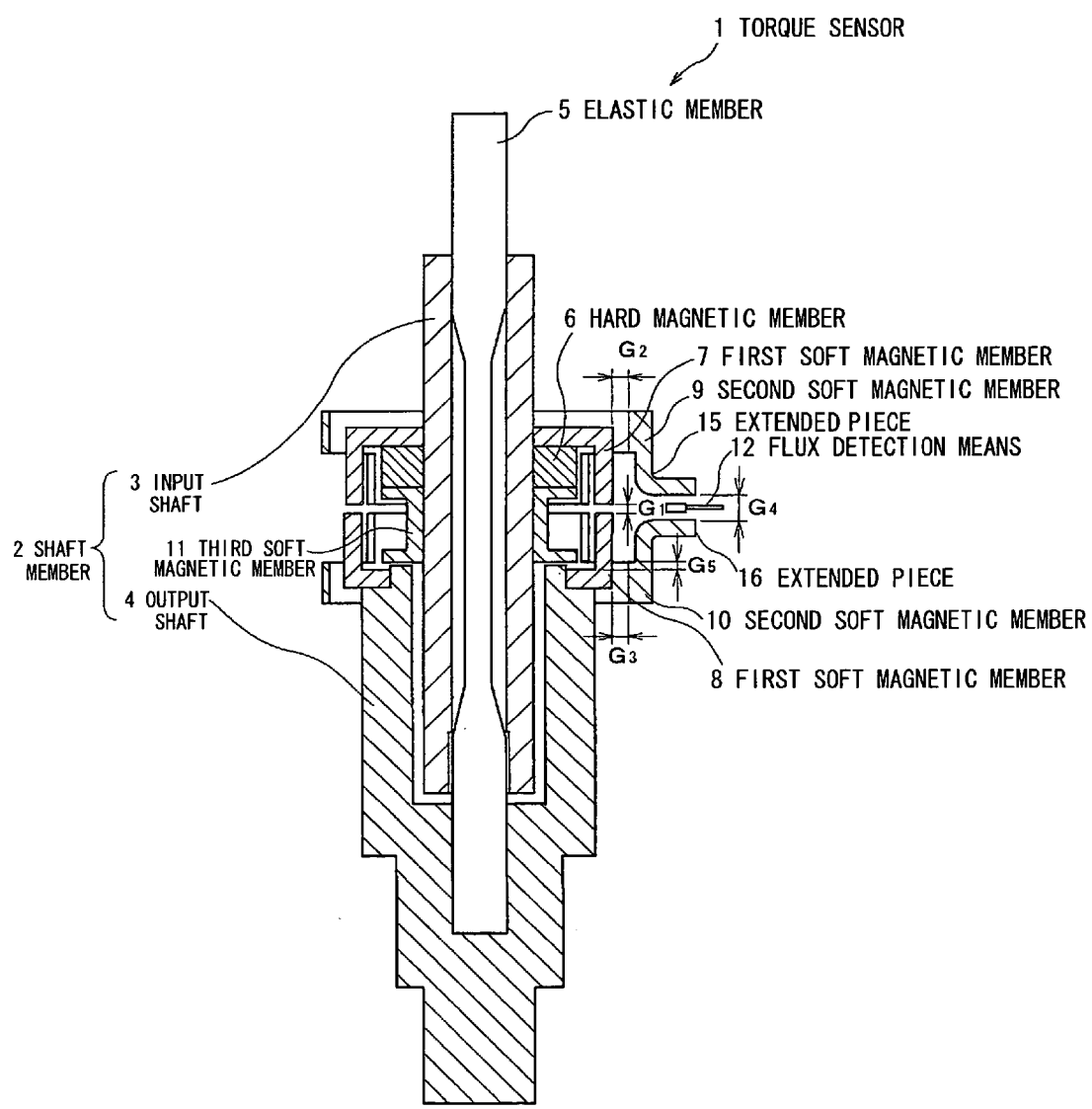
FIG. 1 is a cross sectional view showing a torque sensor in a preferred embodiment according to the present invention.

FIG. 1 is a cross sectional view showing a torque sensor in a preferred embodiment according to the present invention.

Figure 2:
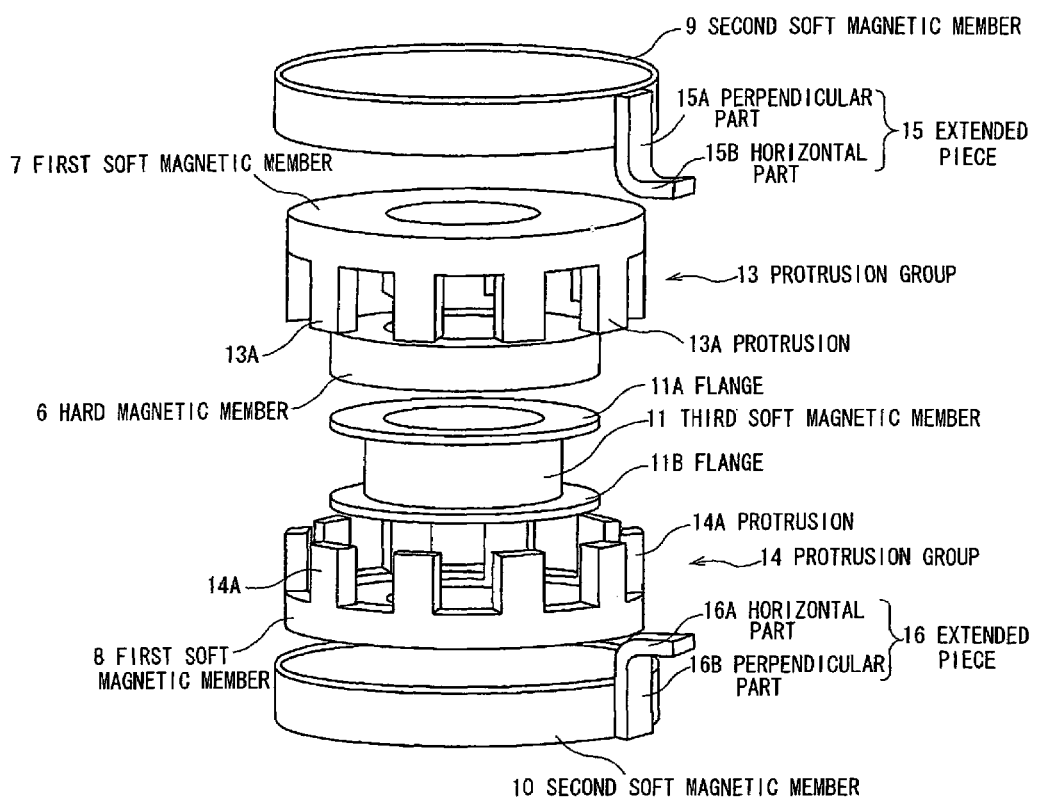
FIG. 2 is an exploded perspective view showing the torque sensor in the preferred embodiment according to the present invention.

FIG. 2 is an exploded perspective view showing the torque sensor in the preferred embodiment according to the present invention.

Figure 3:
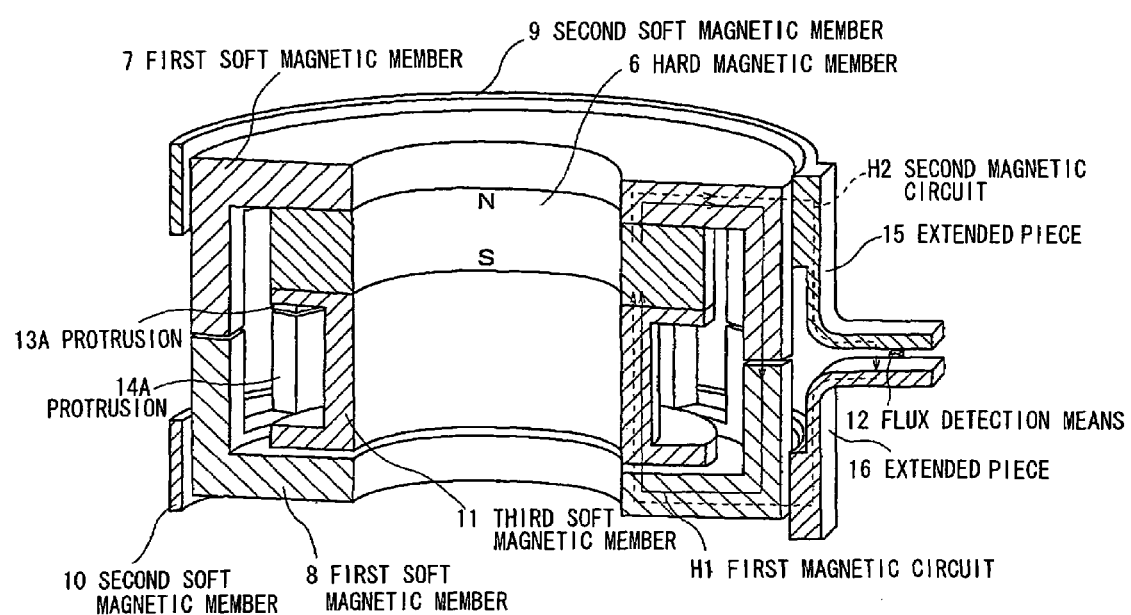
FIG. 3 is a perspective view showing a magnetic circuit of the torque sensor in the preferred embodiment according to the present invention.

FIG. 3 is a perspective view showing a magnetic circuit of the torque sensor in the preferred embodiment according to the present invention.

[Total Structure of a Torque Sensor]

In FIGS. 1 and 2, a torque sensor 1 comprises a shaft member 2 including two shafts 3, 4 (input shaft 3 and output shaft 4) as a torque detection object, an elastic member 5 for connecting coaxially the input shaft 3 and the output shaft 4 with each other, a hard magnetic member 6 which generates a magnetic flux therearound, a pair of first soft magnetic members 7, 8 that constitute a first magnetic circuit HI together with the hard magnetic member 6 to change a magnetoresistance (reluctance) by torsion of the elastic member 5, a pair of second soft magnetic members 9, 10 which constitute a second magnetic circuit H2 together with the hard magnetic member 6 to keep the reluctance constant, a third soft magnetic member 11 which prevents the reluctance from falling in the first magnetic circuit Hi and the second magnetic circuit H2, and a flux detection means 12 which detects a flux density of the second magnetic circuit H2 that varies in accordance with a torsion angle of the elastic member 5.

Herein, the torque sensor 1 is constituted to detect the torque that effects on the shaft member 2 (between the input shaft 3 and the output shaft 4) by detecting the torsion angle of the elastic member 5.

(Structure of the Elastic Member 5)

As shown in FIG. 1, the elastic member 5 comprises a torsion bar that passes through the input shaft 3, and both ends of the elastic member 5 are fixed to each of the input shaft 3 and output shaft 4 by means of pin (not shown), respectively. As explained above, the output shaft 4 and the input shaft 3 are coaxially connected with each other.

(Structure of the Hard Magnetic Member 6)

As shown in FIGS. 1 to 3, the hard magnetic member 6 comprises a cylindrical magnet with no bottom, in which an N pole and an S pole are magnetized in an axial direction. The hard magnetic member 6 is disposed between the first soft magnetic member 7 and the third soft magnetic member 11, and is fixed securely to an outer periphery surface of the input shaft 3. In addition, a life extension of the hard magnetic member 6 can be expected, when multiple pieces of similar kind of magnets are prepared and selectively used for constituting the hard magnetic member 6. For this case, when multiple pieces of different kinds of magnets are used selectively, demagnetization characteristics of respective magnets can be supplemented, so that temperature characteristic of the sensor can be improved.

(Structure of the First Soft Magnetic Members 7, 8)

As shown in FIGS. 1 to 3, each of the first soft magnetic members 7, 8 comprises a bottomless cylindrical magnetic yoke. The first soft magnetic members 7, 8 are disposed to be parallel with each other in the axial direction at an outer periphery of the hard magnetic member 6, and are fixed to the input shaft 3 and the output shaft 4, respectively. The first soft magnetic members 7, 8 as well as the hard magnetic member 6 and the third magnetic member 11 constitute the first magnetic circuit H1, in which the first soft magnetic members 7 and 8 are displaced relatively in a circumferential direction by torsion of the elastic member 5 to change the reluctance.

As shown in FIG. 2, the first soft magnetic member 7 comprises a protrusion group 13 composed of plural protrusions 13A protruding downward, and is formed by notching (cutting off) intermittently in a circumferential direction a lower end of a hollow cylinder (not shown) for magnetic yoke formation. Each of the protrusions 13A comprises a convex piece having a rectangular front surface, and the protrusions 13A are disposed in parallel at regular intervals in the circumferential direction of the first soft magnetic member 7. A tip end surface of the protrusion 13A (free end surface) is a flat surface having a planar shape surrounded by two curves, i.e. inside and outside curves and two straight lines, i.e. right and left lines, which is orthogonal to the shaft member 2 (an axis of the first soft magnetic member 7).

As shown in FIG. 2, the first soft magnetic member 8 comprises a protrusion group 14 composed of plural protrusions 14A protruding upward, and is formed by notching (cutting off) intermittently in the circumferential direction an upper end of a hollow cylinder (not shown) for magnetic yoke formation. Each of the protrusions 14A comprises a convex piece having a rectangular front surface, and the protrusions 13A are disposed in parallel at regular intervals in the circumferential direction of the first soft magnetic member 8. A tip end surface of the protrusion 14A (free end surface) is a flat surface having a planar shape similar to the tip end surface of the protrusion 13A, and is facing to the tip end surface of the protrusion 13A with a gap G1 (shown in FIG. 1) as well as orthogonal to the shaft member 2 (an axis of the first soft magnetic member 9).

(Structure of the Second Soft Magnetic Members 9, 10)

As shown in FIGS. 1 to 3, each of the second soft magnetic members 9, 10 comprises a bottomless cylindrical magnetic yoke. The second soft magnetic members 9, 10 are disposed to be parallel with each other in the axial direction at an outer periphery of the first soft magnetic members 7, 8, respectively and are installed in a fixing system (not shown). The second soft magnetic members 9, 10 as well as the hard magnetic member 6 and the third magnetic member 11 constitute the second magnetic circuit H2, which keeps the reluctance constant.

As shown in FIG. 2, the second soft magnetic member 9 is disposed at an outer periphery of the first soft magnetic member 7 via a gap G2 (shown in FIG. 1). At the outer periphery of the second soft magnetic member 9, a hook shaped extended piece 15 is provided integrally with the second soft magnetic member 9, and the extended piece 15 comprises a perpendicular part 15A protruding in the axial direction (downward) of the second soft magnetic member 9, and a horizontal part 15B protruding to a direction orthogonal to the perpendicular part 15A (a diametrical direction of the second soft magnetic member 9).

As shown in FIG. 2, the second soft magnetic member 10 is disposed at an outer periphery of the first soft magnetic member 8 via a gap G3 (shown in FIG. 1, and G3=G2). At the outer periphery of the second soft magnetic member 10, a hook shaped extended piece 16 is provided integrally with the second soft magnetic member 10, and the extended piece 16 comprises a perpendicular part 16B protruding in the axial direction (downward) of the second soft magnetic member 10 and facing to the extended piece 15 of the second soft magnetic member 9 via a gap G4, and a horizontal part 16A protruding to a direction orthogonal to the perpendicular part 16B (a diametrical direction of the second soft magnetic member 10).

(Structure of the Third Soft Magnetic Member 11)

As shown in FIGS. 1 to 3, the third soft magnetic member 11 comprises a bottomless cylindrical magnetic yoke having flanges 11A, 11B at both ends, respectively, and is disposed between inner peripheries of the first soft magnetic members 7 and 8 and fixed to a lower end of the hard magnetic member 6. A gap G5 is provided between the flange 11B of the third soft magnetic member 11 and an inner surface of the second soft magnetic member 10. In this preferred embodiment, the third soft magnetic member 11 is arranged between the hard magnetic member 6 and the first soft magnetic member 8, however, the present invention is not limited thereto, and the third soft magnetic member may be arranged between the hard magnetic member 6 and the first soft magnetic member 7. In addition, if the gap formed between the hard magnetic member 6 and the first soft magnetic member 8 has dimensions that do not increase the reluctance (which decreases a magnetic force in a long term), the third soft magnetic member 11 may be unnecessary.

(Structure of the Flux Detection Means 12)

As shown in FIGS. 1 to 3, the flux detection means 12 comprises a non-contact type flux detector, and is disposed (in the gap G4) between the extended piece 15 of the second soft magnetic member 9 and the extended piece 16 of the second soft magnetic member 10 and constituted to detect a flux density of the second magnetic circuit H2 which varies in accordance with variation of a torsion angle of the elastic member 5.

(Operation of the Torque Sensor)

Next, an operation of the torque sensor in the preferred embodiment according to the present invention will be explained referring to FIGS. 1, 3, and 4.

Figure 4A:
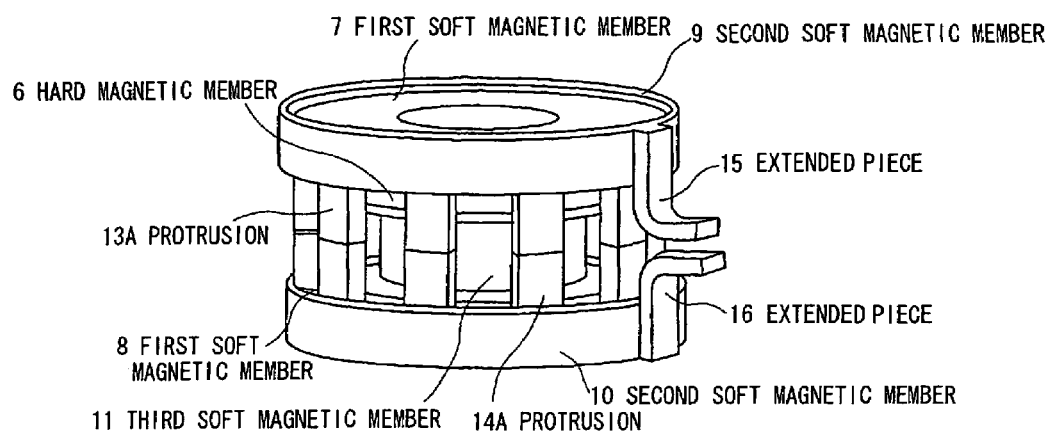
Figure 4B:
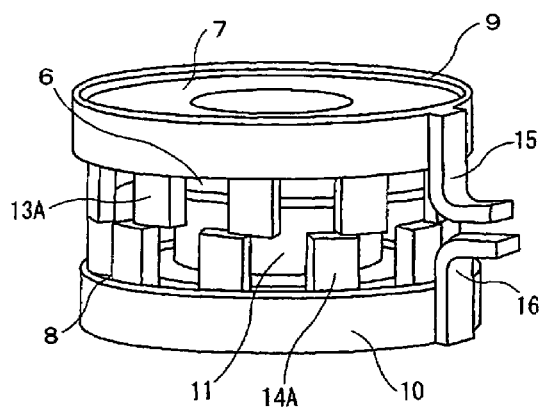

FIGS. 4A and 4B are perspective views showing an operation of the torque sensor in the preferred embodiment according to the present invention, wherein FIG. 4A is a perspective view showing the torque sensor before torsional deformation of an elastic member and FIG. 4B is a perspective view showing the torque sensor after the torsional deformation of the elastic member.

As shown in FIGS. 1 and 3, in the torque sensor 1 according to the preferred embodiment, the first magnetic circuit H1 comprising the hard magnetic member 6 (N pole), the first soft magnetic member 7, the gap G1, the soft magnetic member 8, the gap G5, the soft magnetic member 11, and the hard magnetic member 6 (S pole), and the second magnetic circuit H2 comprising the hard magnetic member 6 (N pole), the first soft magnetic member 7, the gap G2, the soft magnetic member 9, the gap G4, the second soft magnetic member 10, the gap G3, the first soft magnetic member 8, the gap G5, the third soft magnetic member 11, and the hard magnetic member 6 (S pole) are respectively formed. In this preferred embodiment, among the flux appearing from the N pole of the hard magnetic member 6, the flux that returns to the S pole without passing through the magnetic circuits H1, H2 is vanishingly small.

At this time, when the torque affects on the shaft member 2 (the input shaft 3) to generate the torsion of the elastic member 5, the first soft magnetic member 7 is displaced in the circumferential direction from a position shown in FIG. 4A in accordance with a torsion angle of the elastic member 5, so that the first soft magnetic member 7 is disposed at a point shown in FIG. 4B.

For this case, when the first soft magnetic member 7 is displaced, and the protrusion 13A and the protrusion 14A are shifted relatively in the circumferential direction, a facing area of the tip end surface of each of the protrusions 13A, 14A decreases relative to each other. As a result, the reluctance between the first soft magnetic members 7 and 8 (in the first magnetic circuit H1) becomes large, so that a magnetic flux flowing through the first magnetic circuit H1 decreases. On the other hand, since the reluctance between the second soft magnetic members 9 and 10 (in the second magnetic circuit H2) is constant regardless of the presence of the torque affecting on the shaft member 2, the flux flowing through the second magnetic circuit H2 increases.

For another case, the protrusion 13A and the protrusion 14A may be shifted relatively in the circumferential direction, such that a facing area of the tip end surface of each of the protrusions 13A, 14A increases relative to each other. As a result, the reluctance between the first soft magnetic members 7 and 8 (in the first magnetic circuit H1) becomes small, so that the magnetic flux flowing through the first magnetic circuit H1 increases. On the other hand, the flux flowing through the second magnetic circuit H2 decreases.

For another case, the protrusion 13A and the protrusion 14A may be shifted relatively in the circumferential direction, such that a facing area of the tip end surface of each of the protrusions 13A, 14A increases each other. As a result, the reluctance between the first soft magnetic members 7 and 8 (in the first magnetic circuit H1) becomes small, so that the magnetic flux flowing through the first magnetic circuit H1 increases. On the other hand, the flux flowing through the second magnetic circuit H2 decreases.

As described above, a magnitude of torsion (torsion angle) generated in the elastic member 5 can be detected as a variation of the flux flowing through the second magnetic circuit H2, so that the detected amount can be obtained as a torque detection amount by the flux detection means 12.

[Effect of the Preferred Embodiment]

According to the first preferred embodiment as described above, following effects can be obtained.

(1) Since there is no relative change between a position of the hard magnetic member 6 and a position of the second soft magnetic members (magnets) 9, 10 due to the torsion of the elastic member 5, the strictness in dimensional accuracy between the hard magnetic member 6 and the second soft magnetic members 9, 10 is not required. According to this structure, the processing and assembling accuracy of component parts including the hard magnetic member 6 and the second soft magnetic members 9, 10 may be reduced, so that the processing and assembling time can be shortened and the processing and assembling cost can be reduced.

(2) Since there is no magnetic pole variation in the circumferential direction, an assembling operation of the magnetic yoke can be easily conducted, so that good assembling workability of the whole sensor can be obtained.

[Variations]

A torque sensor of the present invention is explained above based on the preferred embodiment, however, the present invention is not limited thereto. The present invention can be carried out in various kinds of aspects that do not go beyond a scope of the subject matter of the present invention. By way of example only, following variations are also possible.

Figure 5:
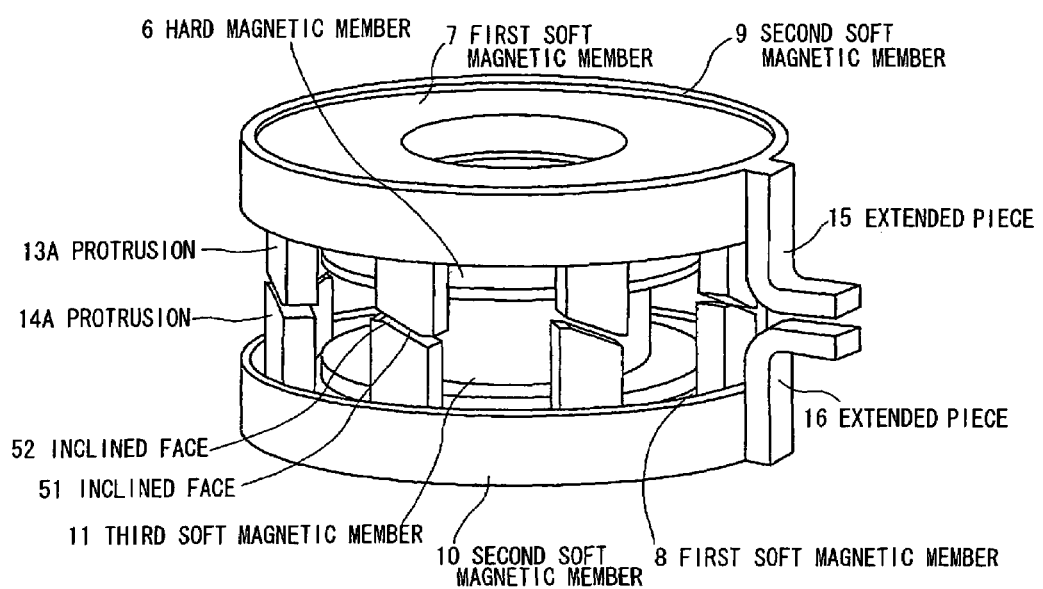
FIG. 5 is a perspective view showing a first variation of a first soft magnetic member in the torque sensor in the preferred embodiment according to the present invention.

(1) In the preferred embodiment, a case where the front shape of each of the protrusions 13A, 14A is rectangular is explained, however, the present invention is not limited thereto. The front shape may be a substantially jagged shape as shown in FIG. 5. For this case, the protrusions 13A, 14A each having a substantially jagged front shape can be formed by cutting off ends in the circumferential direction of the free ends of the protrusions each having a rectangular front surface to provide inclined faces 51, 52. According to this structure, dimensions of a gap formed between the both inclined faces 51 and 52 can be increased, thereby increasing the reluctance. Accordingly, the flux detected by the flux detection means 12 greatly changes between the both inclined faces 51 and 52 against a torsion displacement of the elastic member 5, so that a torque sensor with high sensitivity can be obtained.

Figure 6:
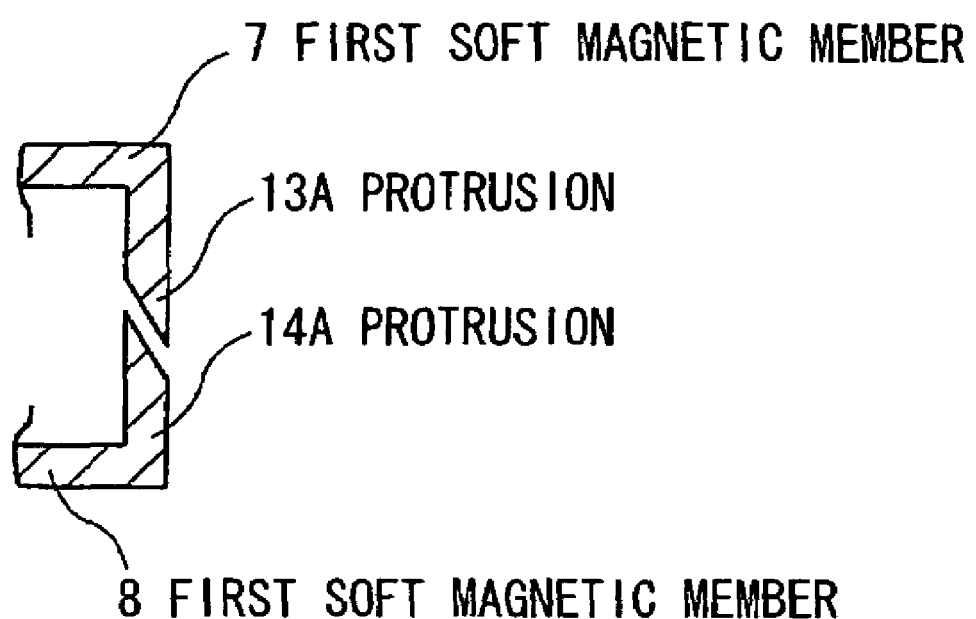
FIG. 6 is a cross sectional view showing a second variation of the first soft magnetic member in the torque sensor in the preferred embodiment according to the present invention.

(2) In the preferred embodiment, a case where the cross section of each of the protrusions 13A, 14A is rectangular is explained, however, the present invention is not limited thereto. The cross section may be a substantially wedge shape as shown in FIG. 6. For this case, the protrusions 13A, 14A each having a substantially wedge cross section can be formed by cutting off ends in the diametrical direction of the free ends of the protrusions each having a rectangular cross section to provide inclined faces 51, 52. According to this structure, the facing areas of the protrusions 13A, 14A can be increased. In case of keeping the same facing areas, dimensions of the first soft magnetic members 7, 8 in the diametrical direction can be shortened. Therefore, miniaturization of the whole sensor can be expected.

Figure 7A:
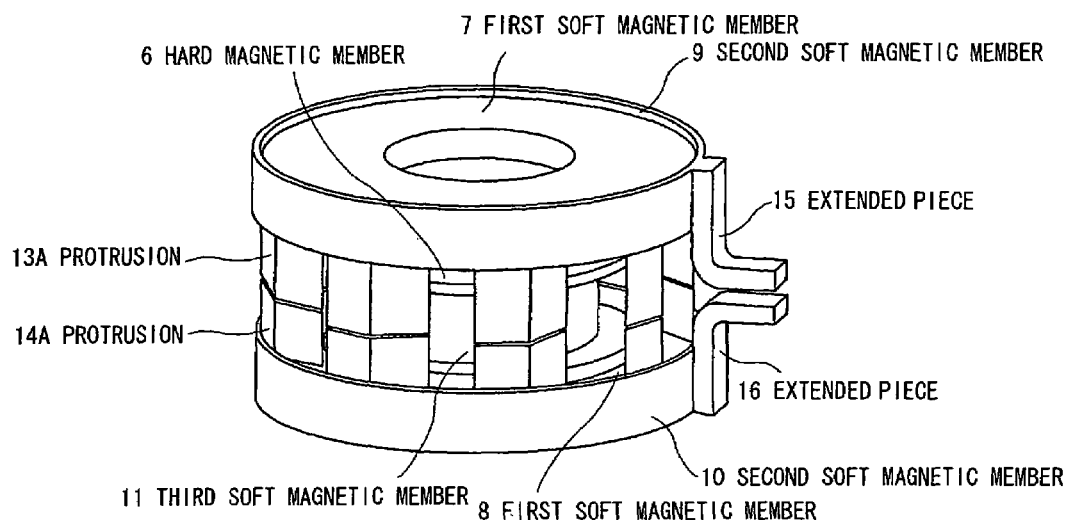
FIGS. 7A and 7B are perspective view and bottom view showing a third variation of the first soft magnetic member in the torque sensor in the preferred embodiment according to the present invention.
Figure 7B:
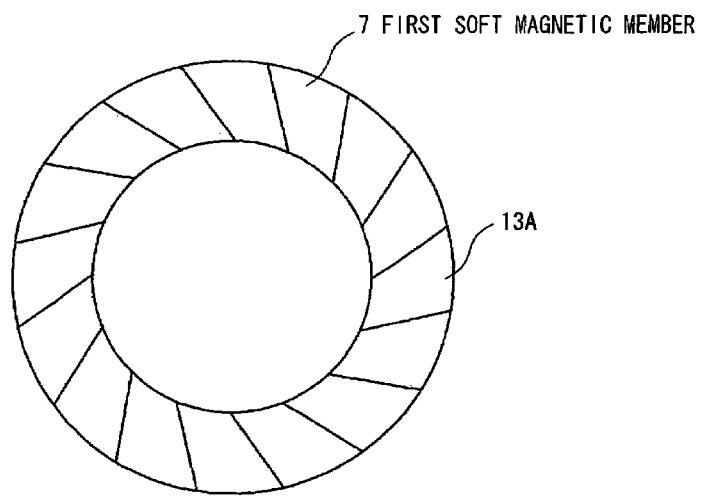

(3) In the preferred embodiment, a case where the tip end shapes of each of the protrusions 13A, 14A is bilaterally symmetric is explained, however, the present invention is not limited thereto. The protrusions 13A, 14A may have asymmetrical tip end shapes as shown in FIGS. 7A and 7B. In brief, the tip end shape of each of the protrusions 13A, 14A according to the present invention may be a configuration in which a variation magnitude of the facing area of the tip end surface is varied in accordance with the torsion angle of the elastic member 5. According to this structure, surface area alteration of the protrusions 13A, 14A (tip end surfaces) varies against the torsion displacement of the elastic member 5, so that a torque sensor with high sensitivity can be obtained. In FIG. 7B, only the first soft magnetic member 7 and the protrusions 13A are shown, and the first soft magnetic member 8 and the protrusions 14A are formed to have a similar structure.

Figure 8:
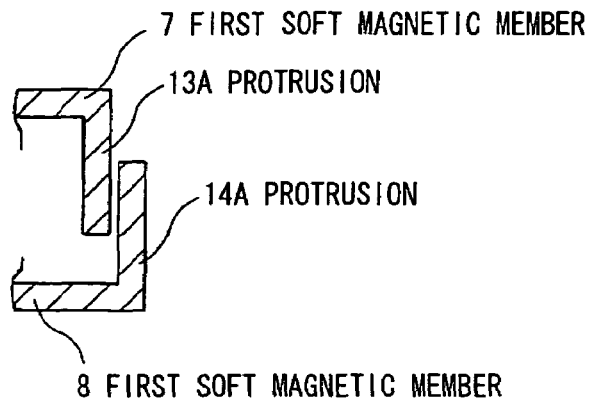
FIG. 8 is a cross sectional view showing a fourth variation of the first soft magnetic member in the torque sensor in the preferred embodiment according to the present invention.
Figure 9:
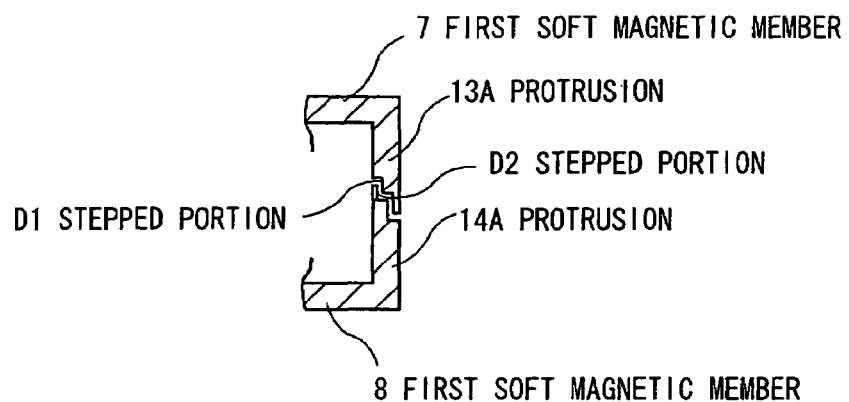
FIG. 9 is a cross sectional view showing a fifth variation of the first soft magnetic member in the torque sensor in the preferred embodiment according to the present invention.

(4) In the preferred embodiment, a case where the tip end surfaces of the protrusions 13A and 14A are facing to each other is explained, however, the present invention is not limited thereto. An inner surface or outer surface of the protrusion 13A may be faced to an inner surface or outer surface of the protrusion 14A as shown in FIG. 8. For this case, as shown in FIG. 9, a stepped portion D1 may be provided at the inner surface of the protrusion 13A and a stepped portion D2 may be provided at the outer surface of the protrusion 14A. According to this structure, the facing areas of the protrusions 13A, 14A can be increased. In case of keeping the same facing areas, dimensions of the first soft magnetic members 7, 8 in the diametrical direction can be shortened. Therefore, miniaturization of the whole sensor can be expected.

Figure 10:
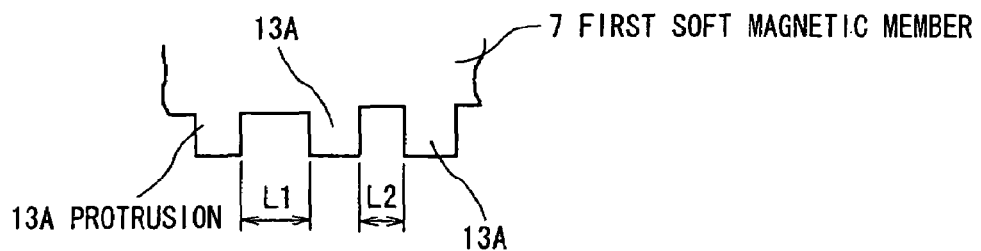
FIG. 10 is a front view showing a sixth variation of the first soft magnetic member in the torque sensor in the preferred embodiment according to the present invention.

(5) In the preferred embodiment, a case where protrusions 13A, 14A are disposed in parallel at equal intervals in the circumferential direction of the first soft magnetic members 7, 8, respectively, is explained. However, the present invention is not limited thereto. Dimensions between adjacent protrusions 13A, 14A of the protrusion groups 13, 14 (only the protrusion group 13 and protrusion 13A are illustrated) may be differentiated along the circumferential direction as shown in FIG. 10. According to this structure, a torque sensor in which the sensitivity can be varied in accordance with the torsion angle of the elastic member 5 can be obtained.

(6) In the preferred embodiment, a case where a flux detector is the non-contact type detector is explained. However, the present invention is not limited thereto, and the flux detector may be a contact-type detector.

(7) In the preferred embodiment, a case where the flux detection means 12 comprises a single flux detector is explained, however, the present invention is not limited thereto. The flux detection means 12 may comprise a plurality of flux detectors having different temperature characteristics. For this case, the flux detectors are selectively disposed in the second magnetic circuit H2.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A torque sensor, comprising:
a shaft member including two shafts;
an elastic member for connecting the shafts coaxially with each other, a torsion angle of the elastic member being detected as a torque that affects the shaft member;
a hard magnetic member fixed to one of the two shafts for generating a magnetic flux therearound, wherein an N pole is arranged at one end of the hard magnetic member and an S pole is arranged at an opposite end of the hard magnetic member in an axial direction;
a pair of first soft magnetic members disposed in parallel with each other in the axial direction around the hard magnetic member, wherein the first soft magnetic members are fixed to the two shafts, respectively, wherein the pair of first soft magnetic members constitutes a first magnetic circuit together with the hard magnetic member, in which the first soft magnetic members are relatively displaced to each other in a circumferential direction by torsion of the elastic member to change a reluctance;
a pair of second soft magnetic members disposed in parallel with each other in the axial direction around the pair of first soft magnetic members, wherein the pair of second soft magnetic members constitutes a second magnetic circuit together with the hard magnetic member to keep the reluctance constant; and
a flux detection means disposed between the second soft magnetic members, for detecting a flux density of the second magnetic circuit that varies in accordance with the torsion angle of the elastic member.

2. The torque sensor, according to claim 1, further comprising:
a third soft magnetic member disposed between one of the first soft magnetic members and the hard magnetic member.

3. The torque sensor, according to claim 2, wherein:
the third soft magnetic member has a cylindrical shape.

4. The torque sensor, according to claim 1, wherein:
the hard magnetic member has a cylindrical shape.

5. The torque sensor, according to claim 1, wherein:
each of the first soft magnetic members has a cylindrical shape.

6. The torque sensor, according to claim 1, wherein:
each of the second soft magnetic members has a cylindrical shape.

7. The torque sensor, according to claim 1, wherein:
each of the first soft magnetic members has protrusions disposed in parallel with each other in a circumferential direction such that tip end surfaces of the protrusions of the first soft magnetic members are facing each other at a predetermined interval in the axial direction.

8. The torque sensor, according to claim 7, wherein:
each of the protrusions is provided with an inclined face formed by cutting off a circumferential direction part of a free end.

9. The torque sensor, according to claim 7, wherein:
each of the protrusions is provided with an inclined face formed by cutting off a diametrical direction part of a free end.

10. The torque sensor, according to claim 7, wherein:
the tip end surface of each of the protrusions has a configuration, which varies a variation magnitude of a facing area of the tip end surface in accordance with variation of the torsion angle of the elastic member.

11. The torque sensor, according to claim 7, wherein:
the protrusions adjacent in the circumferential direction have different dimensions along the circumferential direction of one of the first soft magnetic members.

12. The torque sensor, according to claim 1, wherein:
each of the first soft magnetic members has protrusions disposed in parallel with each other in a circumferential direction such that inner surfaces of the protrusions of one of the first soft magnetic members face outer surfaces of the protrusions of another one of the first soft magnetic members.

13. The torque sensor, according to claim 12, wherein:
each of the inner surfaces of the protrusions of the one of the first soft magnetic members and the outer surfaces of the protrusions of the another one of the first soft magnetic members is provided with a stepped portion.

14. A torque sensor, comprising:
a shaft member including two shafts;
an elastic member for connecting the shafts coaxially with each other, a torsion angle of the elastic member being detected as a torque that affects the shaft member;
a hard magnetic member for generating a magnetic flux therearound;
a pair of first soft magnetic members that constitute a first magnetic circuit together with the hard magnetic member to change a reluctance by torsion of the elastic member;
a pair of second soft magnetic members which constitute a second magnetic circuit together with the hard magnetic member to keep the reluctance constant;
a flux detection means for detecting a flux density of the second magnetic circuit that varies in accordance with the torsion angle of the elastic member; and
a third soft magnetic member disposed between one of the first soft magnetic members and the hard magnetic member.

15. The torque sensor, according to claim 14, wherein:
the third soft magnetic member has a cylindrical shape.

16. A torque sensor, comprising:
a shaft member including two shafts;
an elastic member connecting the shafts coaxially with each other, a torsion angle of the elastic member being detected as a torque that affects the shaft member;
a hard magnetic member fixed to one of the two shafts configured to generate a magnetic flux therearound, wherein an N pole is arranged at one end of the hard magnetic member and an S pole is arranged at an opposite end of the hard magnetic member in an axial direction;
a pair of first soft magnetic members disposed in parallel with each other in the axial direction around the hard magnetic member, wherein the first soft magnetic members are fixed to the two shafts, respectively, wherein the pair of first soft magnetic members constitutes a first magnetic circuit together with the hard magnetic member, in which the first soft magnetic members are relatively displaced to each other in a circumferential direction by torsion of the elastic member to change a reluctance;
a pair of second soft magnetic members disposed in parallel with each other in the axial direction around the pair of first soft magnetic members, wherein the pair of second soft magnetic members constitutes a second magnetic circuit together with the hard magnetic member to keep the reluctance constant; and
a flux detector configured to detect a flux density of the second magnetic circuit that varies in accordance with the torsion angle of the elastic member, wherein the flux detector is disposed between the second soft magnetic members.

* * * * *